(12) United States Patent
Mallet

(10) Patent No.: US 10,922,549 B2
(45) Date of Patent: Feb. 16, 2021

(54) METHOD FOR COUNTING AND IDENTIFYING FISH SPECIES AT A GIVEN LOCATION

(71) Applicant: Delphine Mallet, Noumea (NC)

(72) Inventor: Delphine Mallet, Noumea (NC)

(*) Notice: Subject to any disclaimer, the term of this patent is extended or adjusted under 35 U.S.C. 154(b) by 80 days.

(21) Appl. No.: 16/325,107

(22) PCT Filed: Aug. 17, 2017

(86) PCT No.: PCT/EP2017/070807
§ 371 (c)(1),
(2) Date: Feb. 12, 2019

(87) PCT Pub. No.: WO2018/033588
PCT Pub. Date: Feb. 22, 2018

(65) Prior Publication Data
US 2020/0226384 A1    Jul. 16, 2020

(30) Foreign Application Priority Data

Aug. 19, 2016 (FR) ...................................... 16 57823

(51) Int. Cl.
*G06K 9/00* (2006.01)
*G06T 7/246* (2017.01)
(52) U.S. Cl.
CPC ..... *G06K 9/00718* (2013.01); *G06K 9/00362* (2013.01); *G06T 7/246* (2017.01);
(Continued)

(58) Field of Classification Search
None
See application file for complete search history.

(56) References Cited

U.S. PATENT DOCUMENTS

2007/0154066 A1* 7/2007 Lin .......................... G06T 7/262
                                                                    382/103
2013/0208943 A1* 8/2013 Chuang .................. G06T 7/246
                                                                    382/103
(Continued)

OTHER PUBLICATIONS

International Search Report, dated Nov. 10, 2017, from corresponding PCT application No. PCT/EP2017/070807.
(Continued)

*Primary Examiner* — Suhail Khan
(74) *Attorney, Agent, or Firm* — Nixon & Vanderhye

(57) ABSTRACT

Disclosed is a method for counting and identifying moving objects, P1 to PX, at a given location, including: recording a video of moving objects at a given location, starting at time $T_{initial}$ and finishing at time $T_{final}$; shape recognition of the moving objects by a computer to produce a dynamic trace of each recognized shape P1 to PX; detecting, by image analysis, the maximum number of pixels associated with each recognized and traced object shape of fish P1 to PX; calibration of each trace of the object relative to the general timeline of the entire video between $T_{initial}$ and $T_{final}$; visual determination of the identification of each object by an expert from the image of the video including a maximum pixel number each object P1 to PX and entering the name of the object identity. The method applies in particular to the counting and determination of fish species.

16 Claims, 2 Drawing Sheets

Figure 1:
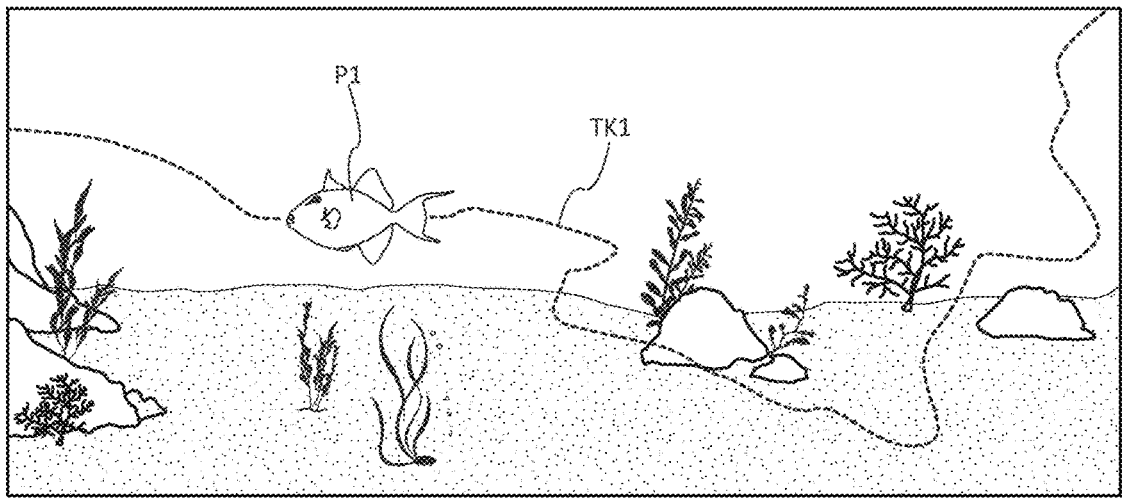

(52) U.S. Cl.
CPC .............. *G06T 2207/10016* (2013.01); *G06T 2207/30242* (2013.01)

(56) References Cited

U.S. PATENT DOCUMENTS

| | | | | |
|---|---|---|---|---|
| 2013/0223693 | A1* | 8/2013 | Chamberlain | G06T 7/0004 382/110 |
| 2017/0103257 | A1* | 4/2017 | Kasin | G06K 9/00335 |
| 2017/0290306 | A1* | 10/2017 | Akitomi | G06M 11/00 |
| 2019/0371140 | A1* | 12/2019 | Drako | H04N 5/23206 |

OTHER PUBLICATIONS

Hossain Ekram et al, "Fish activity tracking and species identification in underwater video," 2016 5th International Conference on Informatics, Electronics and Vision (ICIEV). IEEE,May 13, 2016 (May 13, 2016). pp. 62-66, XP033012703.

Huang Phoenix et al, "Hierarchical classification with reject option for live fish recognition," Machine Vision and Applications, Springer Verlag, DE, vol. 26, No. 1, Sep. 19, 2014 (Sep. 19, 2014), pp. 89-102, XP035424895.

Chuang Meng-Che et al, "Feature Learning and Object Recognition Framework for Underwater Fish Images," IEEE Transactions on Image Processing, IEEE Service Center, Piscataway, NJ, US, vol. 25, No. 4, Apr. 30, 2016 (Apr. 30, 2016), pp. 1862-1872, XP011602611.

Delphine Mallet, "Universite De La Nouvelle-Caledonie Ecole Doctorale du Pacifique (ED 469) These de doctorat Discipline : Ecologie marine & Systemes d'observation Presentee par Des Systemes Video Rotatifs Pour Etudier L'Ichtyofaune," Apr. 24, 2014 (2014-04-24), XP055362976, Retrieved from the Internet: URL:http://citeseerx.ist.psu.edu/viewdoc/download?doi=10.1.1.1016.7154&rep=rep1&type=pdf.

Rife J et al, "Segmentation methods for visual tracking of deep-ocean jellyfish using a conventional camera," IEEE Journal of Oceanic Engineering, IEEE Service Center, Piscataway, NJ, US, vol. 28, No. 4, Oct. 31, 2003 (Oct. 31, 2003), pp. 595-608, XP011104559.

* cited by examiner

METHOD FOR COUNTING AND IDENTIFYING FISH SPECIES AT A GIVEN LOCATION

The object of this invention is to determine the number of fish and the species at a given location, preferably over 360°.

The number and species of fish are important information for tracking species and for marine biology in general.

Hereinafter, "counting and identifying fish species" is defined as the number of fishes per species from which it is possible to deduce both the total number of fish and the total number of species.

So as to determine the numbers and species of fish in an aquatic medium, at a given location, a solution currently consists in placing at the bottom of the water a diver who notes on a tablet the species and number of fishes that he/she sees.

It is difficult for the diver to see beyond his field of vision, significant logistics are required, the information must be re-transcribed, the outings depend on the meteorological conditions, and the duration is necessarily limited.

This solution is complex, costly and does not rely on any modern technology using computer means.

In addition, to recognize the species and to count them, an expert is required to carry out this work that is of limited interest during a counting dive, primarily for a marine biologist, for example.

One approach consists in recording by a digital video camera, over 360°, the fish that circulate in the field of the camera.

The information is then processed visually by viewing said recording of the camera on a screen in taking the necessary time.

It is then noted that the work is not simple because there are a large number of illustrative cases of figures. The analysis time is significant and also requires expertise throughout the viewing. The identification takes approximately 2 minutes and 30 seconds when the final average assessment is done, with this value being obtained from more than 600 videos that are displayed.

This is very important: this corresponds to 15-minute periods at 0230 hours for a 10-minute video.

The video may include few fish, but doing this work carefully involves coming up from behind and zooming-in, and the time is always longer than the duration of the video. In addition, even if the number of fish is limited, it is necessary to view the entire video.

When the fish are very numerous, not only does it take a long time, but it is also necessary to provide breaks to rest the eyes but also the brain that works at a high level of concentration to carry out all of the mental correlations.

Actually, this delayed solution is advantageous in relation to the direct solution, but the drawbacks are numerous.

It is noted that with the analysis being human, there may be normal errors, and it is noted that two different experts do not provide the same conclusions, in addition to fatigue, cost linked to expertise, lack of interest in the mission in itself.

In addition, for the marine biologist, what is advantageous is not the counting work and the assignment of a species to each fish, but rather the conclusions that can be drawn from the numbers that are obtained.

The object of this invention is to propose a method for counting and determining species that is in part automated in such a way as to limit the interventions of experts and to limit the assessment time. This will also have a great advantage because these counting and determining operations can be more numerous and therefore the tracking will be finer and the data more numerous, more reproducible and comprising fewer errors.

Figure 2:
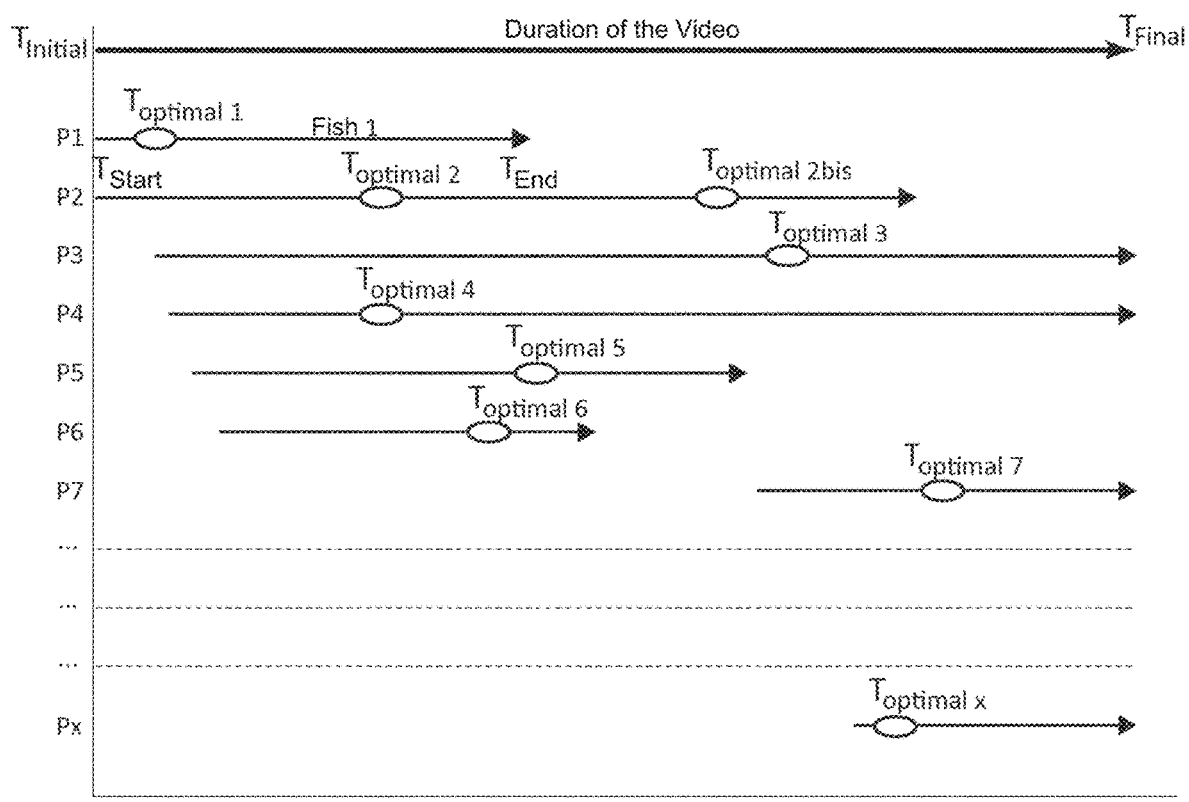

The method for counting and determining of this invention is now described according to a particular, non-limiting embodiment, relative to the accompanying figures that show:

FIG. 1: A view of a depiction of a track of circulation of a fish,

FIG. 2: A view of a video processed according to the method of this invention, FIG. 3: A view of the working means available to the expert, FIG. 4: A view of the table during work.

The method according to this invention consists, in a preferred embodiment of the invention, in recording a 360° video by means of a High Definition camera, for example 1920×1080 pixels, arranged on a support that is ballasted at the bottom of the water so as not to produce disturbances of a human being such as a diver or in the presence of a boat in the vicinity.

The video is in, for example, the MPEG-4 or M2TS format.

The location is determined by the needs of the research workers or more generally the users.

With the video having recorded the fish in motion, it is then available for a screen display.

The video is then processed by the method according to this invention using a computer program in such a way as to automate the steps of the method and to carry them out more quickly.

The video begins at time $T_{initial}$ and ends at time $T_{final}$. This is the total recording period. During the duration of the video, when an element is in motion, the method provides a step for shape recognition by the computer means so as to produce a dynamic track TK1 with said first recognized shape $P_1$, which can be only one fish since the base is immobile, and the bottom algae move but remain in the same perimeter.

This first shape P1 is followed and tracked between the time $T_{start}$ to $T_{end}$ of its appearance and its exit from the image or its disappearance at the bottom of the imaging.

This is the depiction of FIG. 1, in which a single fish is represented as well as its track for the clarity of the drawing.

During the track, the method provides a step for detection by means of image analysis of the number of pixels associated with the recognized and tracked shape of the fish $P_1$.

For each fish, the track is shown by a line of travel as in FIG. 2.

A marking is put on each track, with this marking corresponding to the largest number of pixels of said recognized shape, recorded on said track. This corresponds a priori to the closest view of the fish and therefore the best view for an identification, and a marking $T_{optimal1}$ is produced.

The same is true for the various recognized fish $P_1 \ldots P_x$. Thus, the linear track of each moving fish, present in the video, is recorded, with each track being keyed relative to the general time line of said complete video.

The method makes it possible to have the information obtained in a table.

When the video is thus processed by the method according to this invention, the method provides a step for visual recognition of the species by an expert.

Figure 3:
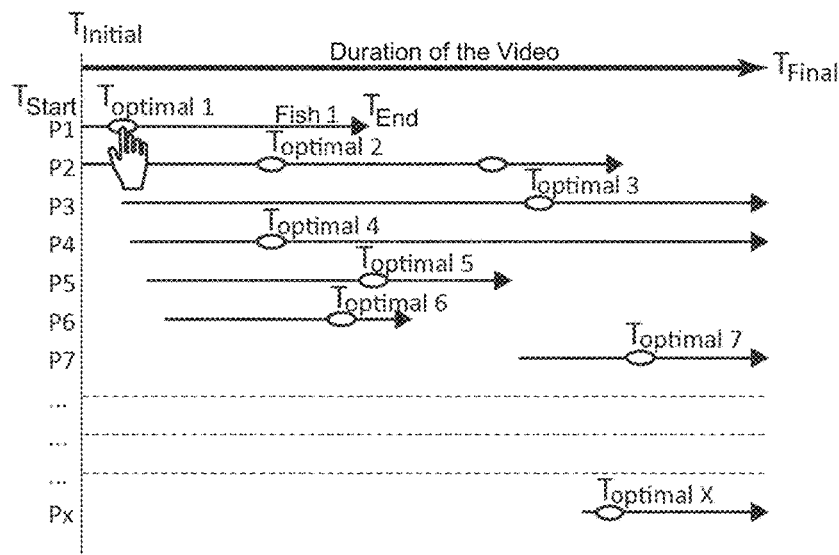
Figure 3:
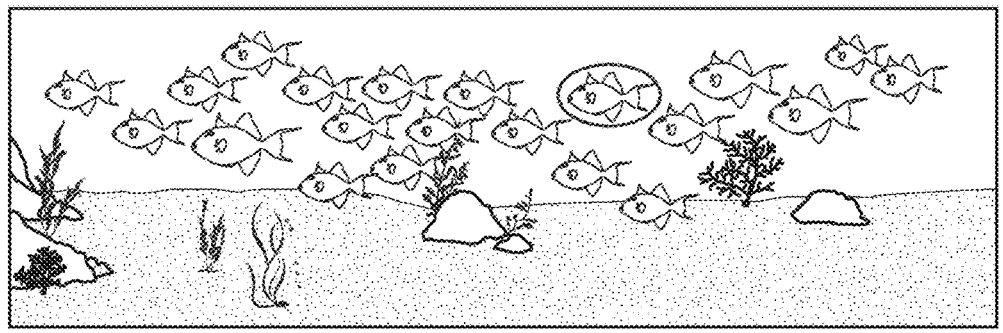

During this step, see FIG. 3, the expert simultaneously has the table in which the various fish $P_1 \ldots P_x$ have been identified and the video in parallel.

The method provides for displaying the video exactly at the moment corresponding to $T_{optimal1}$, of the fish $P_1$, although the expert uses both the best representation of the fish to be identified in the video and data on said fish. The method even provides a graphic stamping, for example a circle, in such a way as to distinguish the fish $P_1$ in question in the image.

The expert can then identify the stamped species very quickly.

Very significant time savings is immediately gained because the expert does not have to run the video of the track of the fish to find the best moment for the identification, and even to go back if the rest of the video is not better.

Help can even be provided to the expert with a window of suggested species so as to cut down a great deal of the capture work.

Figure 4:
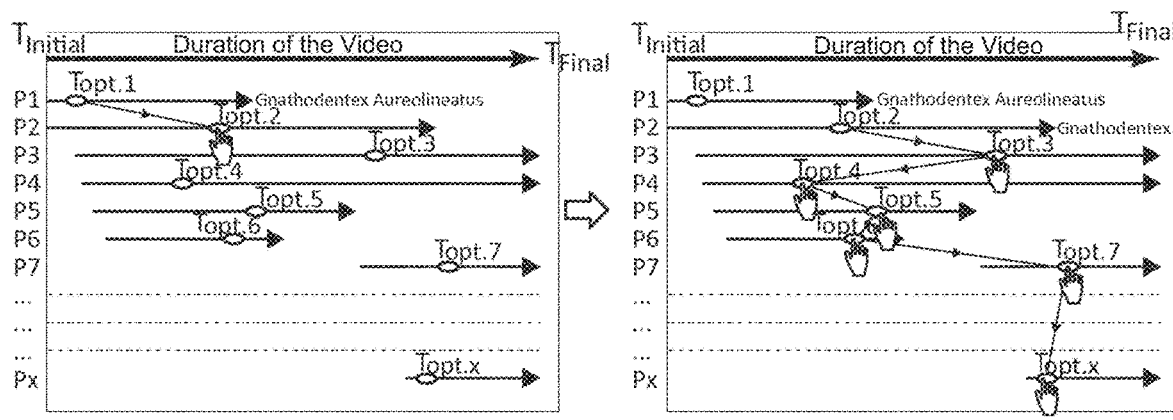

The method then provides the assignment of a species to each fish $P_1 \ldots P_x$. This current step is shown in FIG. 4.

The method thus makes it possible to determine the species for each fish.

As soon as the table receives information on the species, the method provides an optional step but can provide analytical convenience, namely the marking of the fish that is identified by a cross, for example, or else its removal from the video image.

The counting consists in determining the number of fish by species at a given moment.

It is sufficient to base the video at a given time, between $T_{initial}$ and $T_{final}$, and to count the number of fish of each species whose linear track in the table is cut by the vertical of the time corresponding to the selected given time.

It is noted that expertise for counting is no longer necessary and that the work can be carried out by individuals who are not qualified in the identification of species.

In contrast, there are more complicated cases, in particular the case of a fish that passes behind another fish or behind an obstacle such as a rock.

In this case, the method provides for an extrapolation step by calculating the speed of the fish on the track and the highlighting of the direction. If a fish appears and this fish corresponds to a fish that has disappeared from the video that was going in this direction and whose time of disappearance corresponds to the time that it would have taken said fish that disappeared to appear at this location, then the two fish are considered as being only one and the track is extended continuously. Tolerance can also be provided in both time and direction.

This very greatly limits the counting errors.

Another problem that is posed and that the method according to this invention proposes to resolve is that of a shoal of fish, because the work consists in fish-by-fish identification. However, the individuals from the same shoal generally belong to the same species.

Also, when a shoal of fish is identified, all of the fish have been identified one by one each with its track previously during the first step of the method. When the expert identifies a shoal or a group of individuals of the same species simultaneously present in the video, a "grouping" option can be activated. Such an option makes it possible for the expert to point out each fish from the shoal in the video image after having activated the option. Thus, all of the fish of the shoal will be pointed out and then marked as processed or eliminated, although, on the one hand, these fish will not appear in the table to be subjected to the identification of the expert and, on the other hand, the species will be mentioned automatically for each of the fish of the shoal already identified in the summary table.

The method thus makes possible work that produces an error level that is much more limited than that performed visually by an expert.

The time of analysis is considerably reduced for the reasons summarized below:

Display of images of the video and not of the full swarm,

Automatic detection of all of the individuals,

Deletion of possible fish highlighted by image analysis and that would not be fish, such as drifting algae, Immediate display of the fish in question, at best the images along its track, by retaining the largest number of pixels attached to a fish, Limited mental highlighting to distinguish the fish already processed from those that have not been, Very reduced interruptions of the work linked to the need for ocular and mental rest, Part of the work of implementing the method carried out by lower-skill individuals.

The method makes it possible to process shoals of fish, which is fairly common in the marine environment.

Also, if work statistics are compared, it is noted that the mean time for identifying a fish for an expert in the visual method is 2 hours 30 seconds, and 30 seconds for an expert implementing the method according to this invention.

At the end, if the video does not record any fish, the 10 minutes of recording are viewed by an expert while the method according to the invention, after shape recognition, determines that there is no fish and no viewing is necessary.

If a 10-minute video requires a period of analysis by an expert of 25 minutes, this same analysis will take only 2 minutes with the method according to this invention.

The method according to this invention is a very significant advance for the work and for the studies of marine biologists in particular.

It is also noted that the method is applied particularly, in the same way, to the counting and identifying of wildlife but also of movable objects such as vehicles.

Each of these movable objects actually has a shape and an identity.

Likewise, the 360° video was used, but the method can be implemented from a unidirectional or 3D video.

The invention claimed is:

1. A method for counting and identifying movable objects, $P_1$ to $P_x$, at a given location, comprising the series of the following steps, implemented by computer means:
   recording a video of movable objects at a given location, beginning at time $T_{initial}$ and finishing at time $T_{final}$;
   shape recognition of the movable objects to generate recognized shapes, and assigning a dynamic track to each one of the recognized shapes of the objects $P_1$ to $P_x$;
   detection by means of image analysis of a larger number of pixels associated with each shape that is recognized and tracked of the objects $P^1$ to $P_x$;
   keying each track of the object in relation to a general time line of said video; and
   presenting, for visual determination of an identification of each object by an expert, an image of the video comprising the larger number of pixels for each of the objects $P_1$ to $P_x$.

2. The method for counting and identifying movable objects $P_1$ to $P_x$ at a given location according to claim 1, wherein a number of objects of each identification is counted at a given moment between $T_{initial}$ and $T_{final}$.

3. The method for counting and identifying movable objects $P_1$ to $P_x$ at a given location according to claim 1, wherein the video recording is made over 360° under static conditions.

4. The method for counting and identifying movable objects $P_1$ to $P_x$ at a given location according to claim 1, wherein in a condition where an object passes behind another object or behind an obstacle, a step takes place of extrapolation by calculating a speed of the object on the track and highlighting a direction of the object.

5. The method for counting and identifying movable objects $P_1$ to $P_x$ at a given location according to claim 2, wherein the video recording is made over 360° under static conditions.

6. The method for counting and identifying movable objects $P_1$ to $P_x$ at a given location according to claim 2, wherein in a condition where an object passes behind another object or behind an obstacle, a step takes place of extrapolation by calculating a speed of the object on the track and highlighting a direction of the object.

7. The method for counting and identifying movable objects $P_1$ to $P_x$ at a given location according to claim 3, wherein in a condition where an object passes behind another object or behind an obstacle, a step takes place of extrapolation by calculating a speed of the object on the track and highlighting a direction of the object.

8. The method for counting and identifying movable objects $P_1$ to $P_x$ at a given location according to claim 5, wherein in a condition where an object passes behind another object or behind an obstacle, a step takes place of extrapolation by calculating a speed of the object on the track and highlighting a direction of the object.

9. A method for counting and identifying movable objects $P_1$ to $P_x$ at a given location, the movable objects being species of fish in motion in an aquatic medium, said method comprising the following steps implemented by computer means:
  recording a video of the fish in motion in an aquatic medium at a given location, beginning at time $T_{initial}$ and finishing at time $T_{final}$;
  shape recognition of the fish in motion, to generate recognized shapes, and assigning a dynamic track to each one of the recognized shapes of the fish $P_1$ to $P_x$;
  detection by means of image analysis of a larger number of pixels associated with each shape that is recognized and tracked of the fish $P_1$ to $P_x$;
  keying each track in relation to a general time line of said video; and
  presenting, for visual determination of a species of each fish by an expert, an image of the video comprising the larger number of pixels for each of the fish $P_1$ to $P_x$.

10. The method for counting and identifying species of fish $P_1$ to $P_x$ at a given location according to claim 9, wherein a number of fish of each species is counted at a given moment between $T_{initial}$ and $T_{final}$.

11. The method for counting and identifying species of fish $P_1$ to $P_x$ at a given location according to claim 9, wherein the video recording is made over 360° under static conditions.

12. The method for counting and identifying species of fish $P_1$ to $P_x$ at a given location according to claim 9, wherein in a condition where a fish passes behind another fish or behind an obstacle, a step takes place of extrapolation by calculating a speed of the fish on the track and highlighting a direction of the fish.

13. The method for counting and identifying species of fish $P_1$ to $P_x$ at a given location according to claim 10, wherein the video recording is made over 360° under static conditions.

14. The method for counting and identifying species of fish $P_1$ to $P_x$ at a given location according to claim 10, wherein in a condition where a fish passes behind another fish or behind an obstacle, a step takes place of extrapolation by calculating a speed of the fish on the track and highlighting a direction of the fish.

15. The method for counting and identifying species of fish $P_1$ to $P_x$ at a given location according to claim 11, wherein in a condition where a fish passes behind another fish or behind an obstacle, a step takes place of extrapolation by calculating a speed of the fish on the track and highlighting a direction of the fish.

16. The method for counting and identifying species of fish $P_1$ to $P_x$ at a given location according to claim 13, wherein in a condition where a fish passes behind another fish or behind an obstacle, a step takes place of extrapolation by calculating a speed of the fish on the track and highlighting a direction of the fish.

* * * * *